H. McCORNACK.
INTERNAL COMBUSTION ENGINE.
APPLICATION FILED AUG. 21, 1906.

1,077,150.

Patented Oct. 28, 1913.

3 SHEETS—SHEET 1.

Witnesses:
A. G. Dimond.
E. A. Volk.

Inventor.
Herbert McCornack
By Wilhelm, Parker & Hand
Attorneys.

H. McCORNACK.
INTERNAL COMBUSTION ENGINE.
APPLICATION FILED AUG. 21, 1906.

1,077,150.

Patented Oct. 28, 1913.
3 SHEETS—SHEET 2.

Witnesses:
A. G. Dimond.
E. A. Volk.

Inventor.
Herbert McCornack
By Wilhelm, Parker & Hard,
Attorneys.

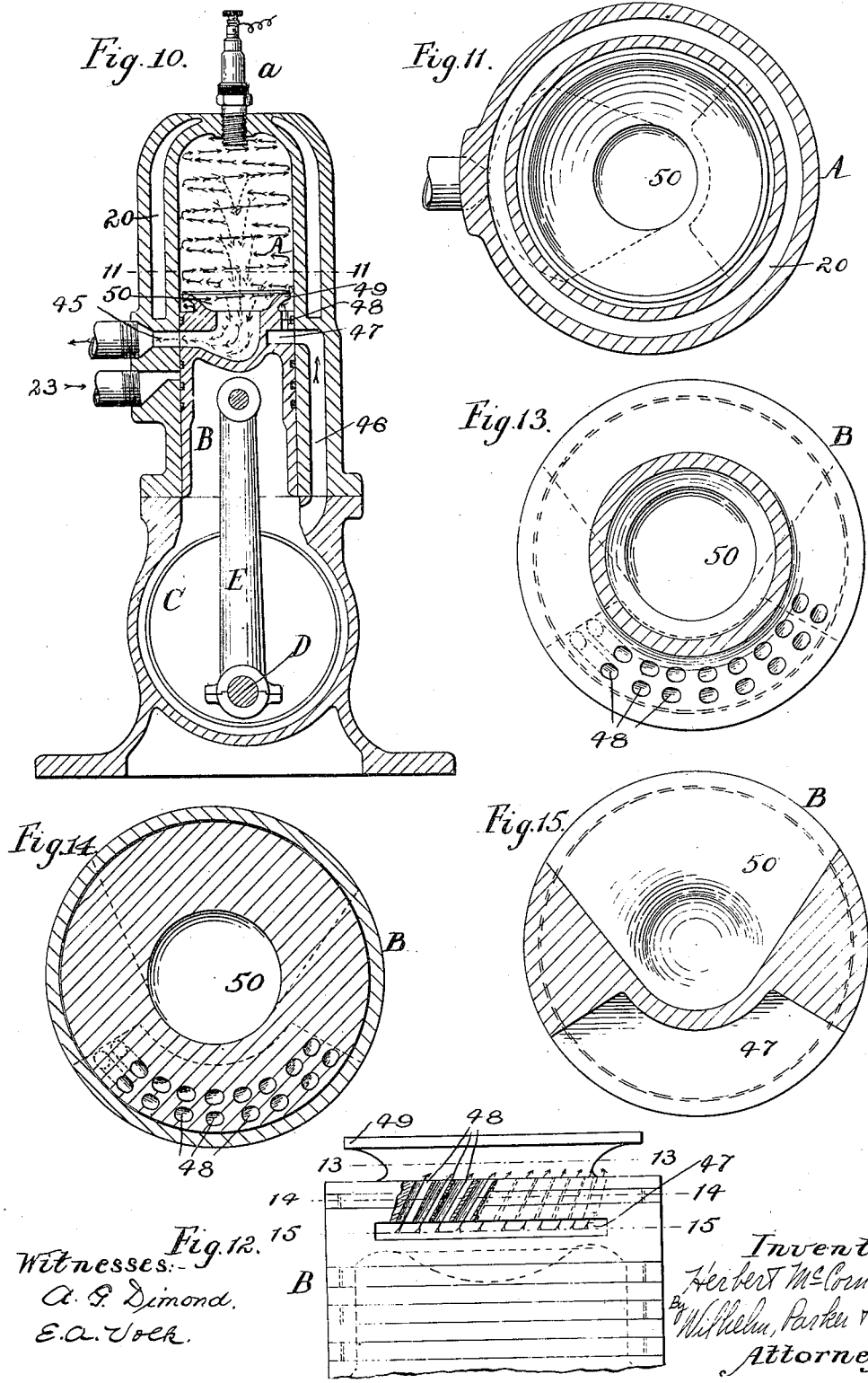

UNITED STATES PATENT OFFICE.

HERBERT McCORNACK, OF WEST CHESTER, PENNSYLVANIA.

INTERNAL-COMBUSTION ENGINE.

1,077,150.   Specification of Letters Patent.   Patented Oct. 28, 1913.

Application filed August 21, 1906. Serial No. 331,513.

*To all whom it may concern:*

Be it known that I, HERBERT McCORNACK, a citizen of the United States, residing at West Chester, in the county of Chester and State of Pennsylvania, have invented a new and useful Improvement in Internal-Combustion Engines, of which the following is a specification.

This invention has reference to that class of internal combustion engines in which a charge of gaseous fuel is supplied to the cylinder for every two strokes of the piston and which are usually referred to as two-cycle engines, and relates more especially to that class of these engines in which the fuel inlet port of the cylinder is opened during the last portion of the power stroke of the piston, shortly after the exhaust port has been opened, so that the fuel inlet port and the exhaust port are open at the same time.

The objects of the invention are to provide simple and efficient means for admitting the fuel to the cylinder and for scavenging the latter and freeing it as completely as possible from the spent gases. To that end the fuel inlet is so constructed that the incoming charge of fresh fuel is admitted to the cylinder with a whirling or rotary movement, whereby the fresh fuel is distributed circumferentially around the inner surface of the cylinder and caused to envelop the burnt gases therein, at the same time driving the latter inwardly, toward the axial portion of the cylinder, where the exhaust port is located. By thus causing the incoming fresh fuel to envelop the burnt gases the commingling of the fresh fuel with the burnt gases is reduced to a minimum, the spent gases are more completely driven out of the cylinder by the incoming fresh fuel and the efficiency of the engine is greatly increased.

Figure 1:
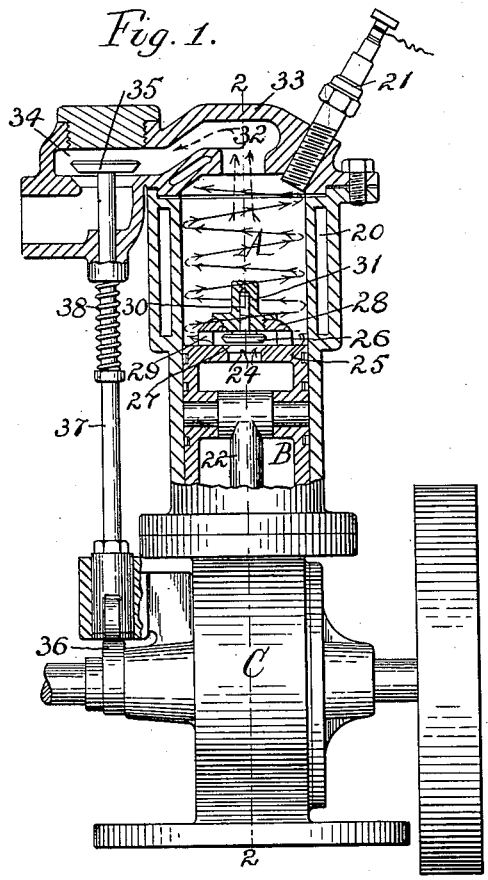
Figure 2:
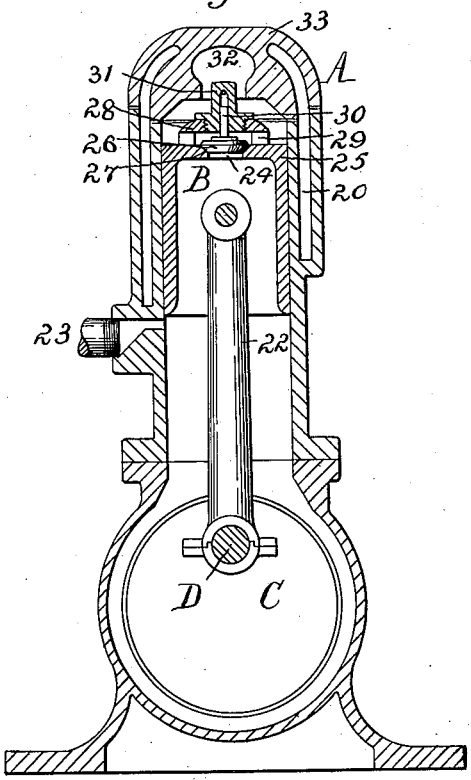
Figure 3:
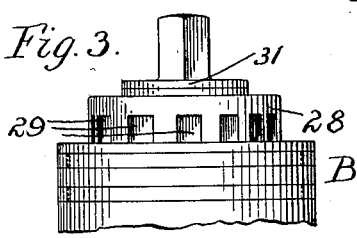
Figure 5:
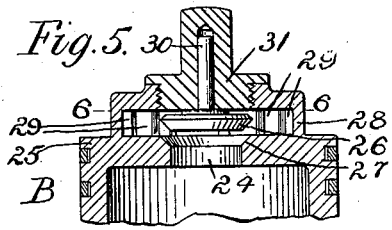
Figure 4:
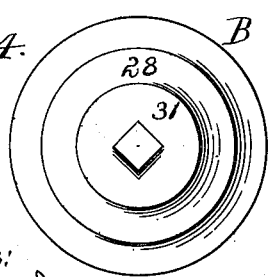
Figure 6:
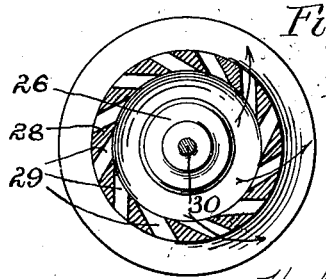
Figure 7:
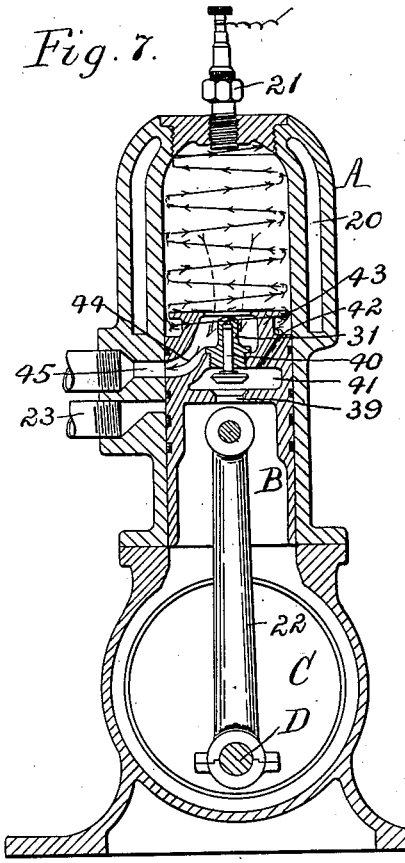
Figure 8:
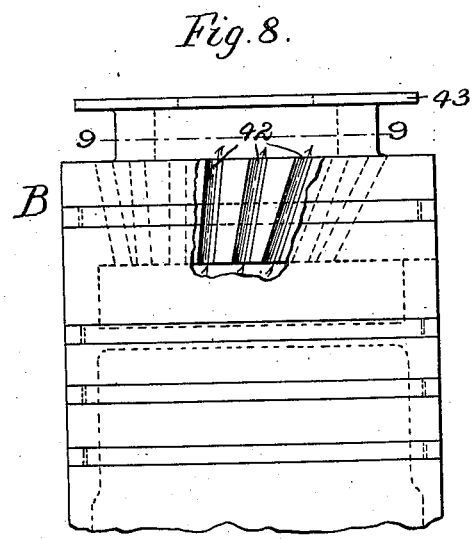
Figure 9:
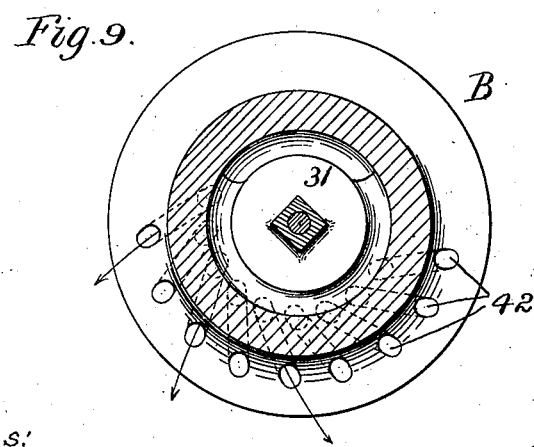

In the accompanying drawings, consisting of three sheets: Figure 1 is a sectional elevation of an engine provided with my improvements in the preferred form. Fig. 2 is a vertical section in line 2—2, Fig. 1, showing the piston in a different position. Fig. 3 is a side elevation of the upper portion of the piston. Fig. 4 is a top plan view thereof. Fig. 5 is a vertical diametrical section through the upper portion of the piston. Fig. 6 is a horizontal section in line 6—6, Fig. 5. Fig. 7 is a sectional elevation of an engine provided with my improvements in a modified form. Fig. 8 is a side elevation, partly in section, on an enlarged scale, of the piston of this modified construction. Fig. 9 is a horizontal section in line 9—9, Fig. 8. Fig. 10 is a sectional elevation of an engine provided with my improvements in another modified form. Fig. 11 is a horizontal section in line 11—11, Fig. 10, on an enlarged scale. Fig. 12 is a side elevation, partly in section, of the upper portion of the piston, on an enlarged scale. Figs. 13, 14 and 15 are horizontal sections in lines 13—13, 14—14, and 15—15, respectively, in Fig. 12.

Like reference letters and numerals refer to like parts in the several figures.

Referring to Figs. 1-6, which represent the invention embodied in an upright engine, A represents the cylinder provided with the usual cooling jacket 20 and with a sparker or igniter 21. B represents the piston and C the compression chamber upon which the cylinder A is mounted and in which the crank D rotates which is connected with the piston by the rod 22. 23 represents the fuel supply port for the compression chamber which is arranged in the lower portion of the cylinder, at one side thereof, for supplying the gaseous fuel to the compression chamber when the piston is near the end of its return stroke, the gas in the chamber being compressed by the piston during the power stroke. 24 represents the fuel admission port of the piston, formed centrally in the head or top 25 thereof and governed by a free valve 26 which operates automatically and is arranged above said top so as to seat itself downwardly in a seat 27 formed in said port. This valve is arranged in the chamber of a distributing head 28 mounted upon the piston head and provided in its marginal or peripheral portion with admission passages 29 through which the fuel passes from the chamber or cavity of the distributing head outwardly into the cylinder. The free admission valve 26 is provided with an upright stem 30 which is guided in the distributing head, the latter being preferably constructed with a central screw plug 31 which permits of the easy insertion of the valve and in which the valve stem is guided. The admission passages 29 are arranged in planes which stand obliquely or tangentially to radial planes laid through the mouth of these passages, so that the jets of gas which issue from these passages into the cylinder strike the inner surface of the latter obliquely instead of radially, whereby the incoming gas is caused to form a whirling or rotating layer, which is held by centrifugal force against the inner surface of the cylinder and is distributed circumferentially around the same. This whirling or rotating layer of fresh fuel increases in thickness toward the axial line of the cylinder and drives the spent gases in the cylinder inwardly or toward the axial portion of the same. 32 represents the exhaust port which is arranged centrally in the upper cylinder head 33 and which extends laterally to a chamber 34 in which the exhaust valve 35 is arranged. The latter is operated in any suitable manner, for instance, from the engine shaft by a cam 36, rod 37 and spring 38.

In the position of the parts represented in Fig. 1, the piston is at the end of the power stroke and the free admission valve 26 is open. As the piston moves upwardly the valve closes by its inertia, and the pressure of the gas which is being compressed in the cylinder above the piston, as the latter continues its upward movement, holds the valve tightly to its seat during the compression stroke, as represented in Fig. 2. The valve remains seated during the following power stroke until toward the end of this stroke, when the pressure on the valve is relieved by the opening of the exhaust valve and is overcome by the pressure in the compression chamber which tends to open the admission valve. The latter is now opened and the fresh fuel rushes into the cylinder, whirls around in the same and drives the spent gases into the axial portion of the cylinder and out through the axial exhaust port. The whirling or rotary layer of fresh fuel hugs the inner surface of the cylinder closely and as it increases in thickness or volume drives the lighter or less dense spent gases inwardly. The whirling motion of the fresh fuel and the greater density thereof tend to keep the same separate from the lighter spent gases which form a diminishing and finally disappearing central or core portion in the body of gases in the cylinder. In this manner the cylinder is quickly and thoroughly scavenged or freed from the spent gases. The fresh fuel rushing upwardly through the central admission port 24 of the piston strikes against the under side of the distributing head 28 and is deflected outwardly and in part or to some extent downwardly by the latter against the top of the piston, near the periphery thereof, from which it is deflected upwardly in a tangential or oblique direction into the cylinder.

In the embodiment of the invention represented in Figs. 7-9, the piston is provided with an exhaust port which extends from the end of the piston to one side thereof and the lateral admission passages of the piston are arranged on one side of the latter. In this construction, 39 represents the central admission port of the piston, 40 the free admission valve, 41 the valve chamber, 42 the lateral admission passages which exhaust from this chamber upwardly and outwardly and at an angle to the radial plane and open at their upper ends into the cylinder so as to deliver the jets of fresh fuel into the latter in a tangential direction. The piston is preferably provided above these tangential admission passages with an overhanging flange 43 which is separated from the cylinder by a narrow annular space through which the gas issues in a thin whirling layer along the inner surface of the cylinder. 44 represents the exhaust port which extends from the center of the piston, at the upper end thereof, downwardly and opens on one side of the piston, so as to register with the exhaust port 45 in the side of the cylinder, when the piston has nearly reached the end of the power stroke. The exhaust port 44 is arranged in the piston on one side and the tangential admission passages 42 on the opposite side.

In the embodiment of the invention represented in Figs. 10-15, the fuel admission port of the piston is not controlled by a valve but by an admission port which is formed in the side of the cylinder. In this construction, 46 represents the fuel admission port of the cylinder which extends from the compression chamber C upwardly and opens at its upper end inwardly through the wall of the cylinder. 47 represents the fuel admission port of the piston which has the form of a recess formed in the side of the piston so as to register with the upper end of the cylinder port 46. This external admission port of the piston is provided with one or more admission passages or nozzles 48 which are arranged at an angle to the radial plane or open tangentially into the cylinder, so as to direct the streams or jets of fresh fuel into the cylinder in such manner that the fuel whirls or rotates in the same. These passages are preferably arranged underneath an overhanging flange 49 which assists in causing the fresh fuel to enter the cylinder close to the inner surface thereof. 50 represents the exhaust port of the piston which has its inlet arranged centrally in the top or head of the piston and which extends downwardly in the piston and then to one side so that its outlet registers with the cylinder exhaust port 45 when the piston approaches the end of the power stroke. Certain features described and shown herein are not specifically claimed in this application, the same forming the subject of claims in Patent No. 1,036,503, granted Aug. 20, 1912, upon an application filed concurrently herewith.

I claim as my invention:

1. In an internal combustion engine, the combination with a cylinder, of a piston therein which is provided with a fuel admission passage having an open end which discharges toward the circumferential wall of the cylinder and extends in a direction oblique to a radial plane passing through the center of the mouth of the passage, whereby the fuel is directed against the inner surface of the cylinder in an oblique or tangential direction and caused to whirl in contact with the inner surface of the cylinder, means for admitting fuel to said passage when the piston nears the end of its power stroke, substantially as set forth.

2. In an internal combustion engine, the combination with a cylinder, of a piston therein which is provided with a fuel admission passage which opens toward the circumferential wall of the cylinder and extends in a direction oblique to a radial plane passing through the center of the mouth of the passage, and an axial exhaust port arranged in the head of the cylinder, substantially as set forth.

3. The combination of a cylinder, a reciprocating piston arranged therein and provided with a fuel admission port, a distributing chamber in said piston which receives the fuel from said port, and an admission passage leading from said chamber and opening into said cylinder in a direction oblique to a radial plane passing through the center of the mouth of said passage, means for admitting fuel to said passage when the piston nears the end of its power stroke, substantially as set forth.

4. The combination of a cylinder, a reciprocating piston arranged therein and provided with a fuel admission port, a free automatic admission valve controlling said port, a distributing chamber which receives the fuel from said port, and an admission passage leading from said chamber and opening into said cylinder in a direction oblique to a radial plane passing through the center of the mouth of said passage, means for admitting fuel to said passage when the piston nears the end of its power stroke, substantially as set forth.

5. The combination of a cylinder, a reciprocating piston arranged therein and provided with a fuel admission port, a distributing head which surmounts said port and which is provided with a valve chamber receiving the fuel from said port and with admission passages opening into the cylinder in a direction oblique to radial planes passing through the centers of the mouths of said passages, and a free automatic valve arranged in said chamber and controlling said port, substantially as set forth.

6. In an internal combustion engine, the combination with a cylinder, of a piston therein which is provided with a fuel admission passage having an open end which discharges toward the circumferential wall of the cylinder and extends in a direction oblique to a radial plane passing through the center of the mouth of the passage, whereby the fuel is directed against the inner surface of the cylinder in an oblique or tangential direction and caused to whirl in contact with the inner surface of the cylinder, means for admitting fuel to said passage when the piston nears the end of its power stroke, and an exhaust passage in said cylinder which is also opened when the piston nears the end of its power stroke, substantially as set forth.

Witness my hand this 14th day of August, 1906.

HERBERT McCORNACK.

Witnesses:
ARTHUR P. REID,
JANE BARD ZACHUS.